May 8, 1962 S. J. SIKORA 3,033,495
AUTOPILOT FORCE LINK
Filed April 25, 1960 2 Sheets-Sheet 1
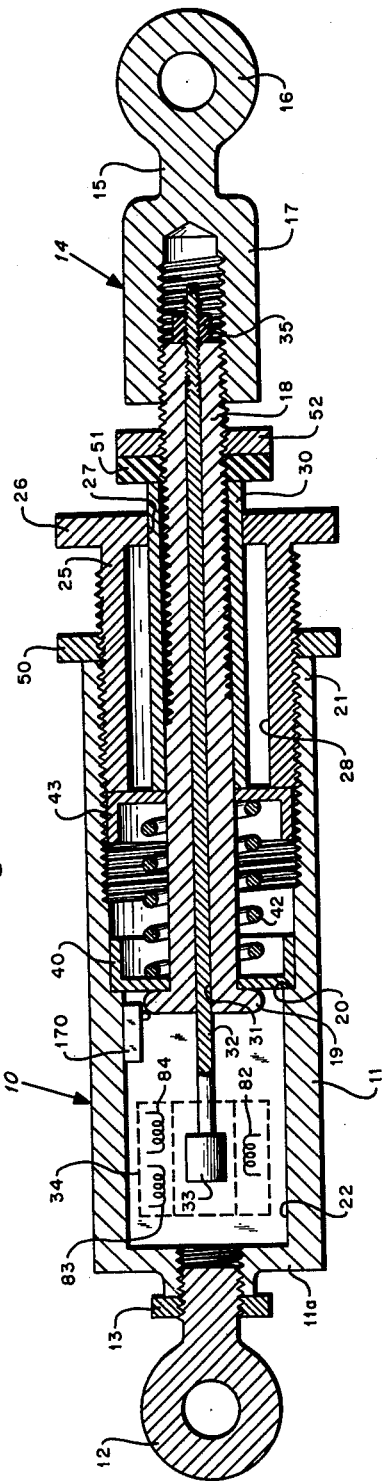
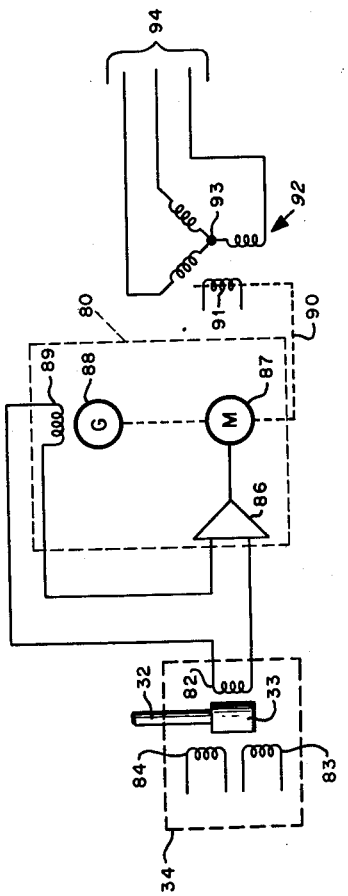
INVENTOR.
STEPHEN J. SIKORA
BY
AGENT May 8, 1962 S. J. SIKORA 3,033,495
AUTOPILOT FORCE LINK
Filed April 25, 1960 2 Sheets-Sheet 2
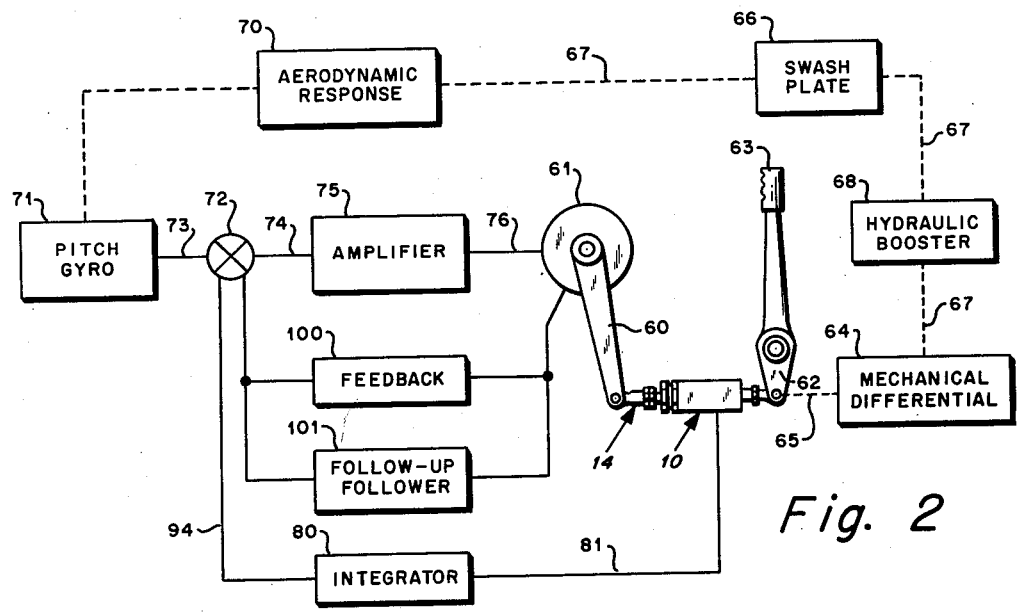
Fig. 2
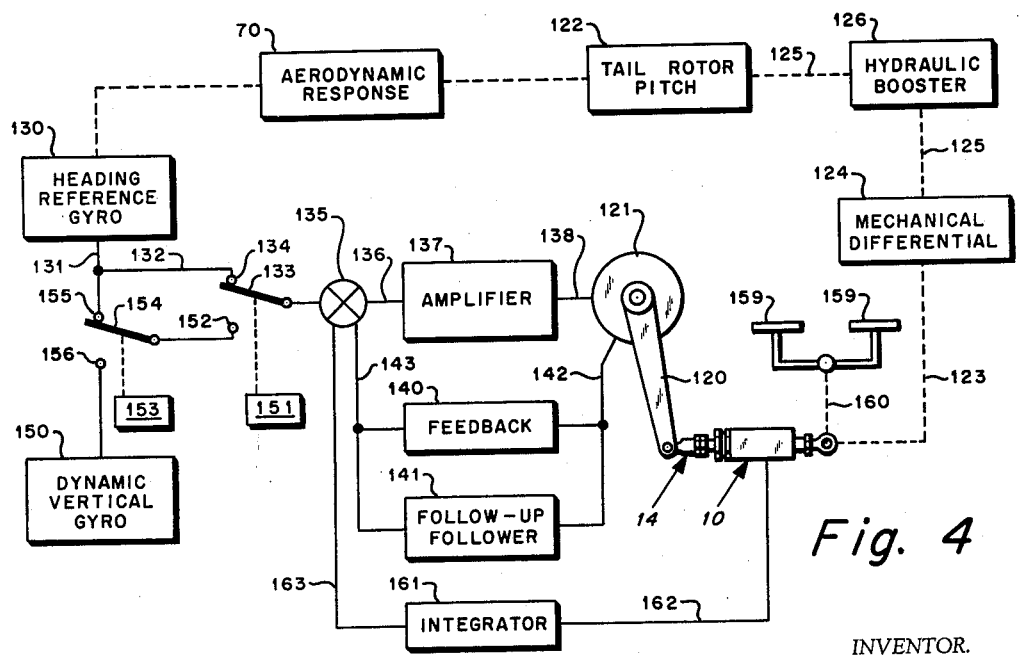
Fig. 4
INVENTOR.
STEPHEN J. SIKORA
BY 
AGENT United States Patent Office 3,033,495
Patented May 8, 1962

3,033,495
AUTOPILOT FORCE LINK
Stephen J. Sikora, Warminster, Pa., assignor to the United States of America as represented by the Secretary of the Navy
Filed Apr. 25, 1960, Ser. No. 24,633
11 Claims. (Cl. 244—76)
(Granted under Title 35, U.S. Code (1952), sec. 266)

The invention described herein may be manufactured and used by or for the Government of the United States of America for governmental purposes without the payment of any royalties thereon or therefor.

The present invention relates to aircraft control systems, and more particularly the invention relates to an automatically and manually operated aircraft control system.

An object of this invention is the provision of novel means for establishing a new attitude reference for an aircraft in the pitch, roll and yaw axes without switching the automatic pilot off but by merely manipulating the manual controls.

Another object of the invention is the provision of a novel force link for use in an aircraft adapted to be manually and automatically controlled, the force link permitting the attitude of the aircraft to be changed by the mere manipulation of the manual controls and for establishing new attitude references in the pitch, roll and/or yaw axes without switching off the automatic pilot.

Yet another object of the invention is the provision of a novel force link for use in the control linkages of an aircraft and more particularly in a rotary wing aircraft, wherein the automatic pilot need not be switched off in order for a new aircraft attitude to be established in the pitch, roll and yaw axes, the autopilot continuing to maintain the aircraft at the newly established attitude after the manual controls have been released.

Another object of the invention is the provision of a novel compact and simple electromechanical force link suitable for use in the pitch, roll and yaw channels of an autopilot.

A further object of the invention is the provision of an easily adjustable autopilot force link comprising a spring-loaded plunger in a housing arranged in such a manner that push or pull on the plunger in the housing is resisted by a spring, the spring being compressed whenever the force link is extended or contracted along the longitudinal axis thereof.

A still further object of the invention is the provision of coaxial signal pickoff means in the force link adapted to transmit a signal representative of the relative displacement of the plunger and the housing and indicative of whether the force link has been contracted or elongated.

A still further object of the invention is the provision of a means for feeding a signal back to the input of an autopilot servomechanism which is proportional to the length of time that the force link is elongated or contracted, as set forth in the preceding object, algebraically multiplied by the magnitude of the elongation or contraction of the force link, the algebraic product of the time and displacement magnitudes being integrated and fed at a predetermined rate to the input of the servomechanism of the autopilot.

The invention further resides in certain novel features of construction, combinations and arrangements of parts, and further objects and advantages of the invention will be apparent to those skilled in the art to which it pertains from the following description of the preferred embodiment thereof, described with reference to the accompanying drawings in which similar reference characters represent corresponding parts throughout the several views, and in which:

FIG. 1 is a longitudinal sectional view of a force link device;

FIG. 2 is a schematic electromechanical diagram of an automatic pilot and manual aircraft control system embodying the invention for controlling an aircraft about either the pitch or roll axis of the aircraft;

FIG. 3 is a schematic electromechanical diagram of the preferred form of an integrator shown in FIG. 2; and FIG. 4 is a schematic electromechanical diagram of an automatic pilot and manual aircraft control system embodying the invention for the yaw axis of an aircraft.

It is to be understood that the invention is not limited to the details of construction and arrangement of parts shown in the drawings and hereinafter described in detail, but is capable of being otherwise embodied and of being practiced and carried out in various ways. It is to be further understood that the phraseology or terminology employed herein is for the purpose of description and there is no intention to herein limit the invention beyond the requirements for the prior art.

Referring to FIG. 1, a device embodying invention and hereinafter referred to as a force link is indicated generally by the reference numeral 10. The force link 10 comprises a housing 11 having an eye 12 threaded into and fixed with a lock nut 13 to a closed end 11a thereof, and a plunger assembly, indicated generally by the reference numeral 14. The plunger assembly 14 comprises a rod end member 15 having an eye 16 at one end thereof and an internally threaded nut portion 17 threaded onto the outer end of a cylindrical actuating shaft 18.

The actuating shaft 18 is threaded throughout approximately half of its length and extends a substantial distance inside of the housing 11 so that a flanged end portion 19 thereof is normally substantially coplanar with an internal annular shoulder portion 20 located substantially two-thirds from the outer open end 21 of the housing 11. The housing 11 is formed with a rectangular opening 22 in the bottom or closed end 11a and with a cylindrical bore or wall 23 forming the balance of the internal wall of the cup-shaped housing 11. The outer end of the wall 23 is internally threaded so as to receive an externally threaded adjustable preloading screw 25 which has a hexagonally-shaped radial flange 26 at the outer end thereof. The preloading screw 25 has a central cylindrical opening 27 and a counterbore portion 28 so as to reduce the sliding friction between the preloading screw 25 and a hollow shaft sleeve 30.

The actuating shaft 18 has a central cylindrical passage 31 for receiving an armature positioning rod 32 which on the extreme inner end thereof carries a variable impedance transformer core 33 movable with respect to the fixed windings of a variable impedance transformer 34 fixed in the bottom of the housing 11 and conforming to the shape of the wall 22 of the housing 11. The outer end of the armature positioning rod 32 is slotted for a screwdriver and is provided with a lock nut 35 threaded thereon so as to permit the armature 33 to be adjusted to a zero output or central position within the transformer 34 and then locked in position.

The actuating shaft 18 has a cup-shaped spring retaining washer 40 on the inner end thereof normally biased against the flange 19 and seated against the internal shoulder 20 of the housing 11.

The actuating shaft 18 has an helical spring 42 disposed thereabout with one end of the spring acting against the washer 40 and with the other end acting against an identical but oppositely facing cup-shaped spring retaining washer 43. The backside of the washer 43 is shown engaging the terminal inner ends of the preloading screw 25 and the sleeve 30, FIG. 1.

The spring 42 is preloaded by adjusting the preloading screw 25 so that a load of preferably 50 pounds per inch of displacement is required to elongate or contract the force link 10. It is to be understood, however, that the preload of the spring 42 can be set at any force so that when a predetermined force is exerted against the force link 10, the force link 10 is contracted or extended by compressing the spring 42. Therefore, the force link 10 will transfer forces up to 50 pounds, and any load thereover will cause relative axial displacement of the core 33 within the transformer 34.

A lock nut 50 is provided on the preloading screw 25 so that the preload adjustment can be maintained. Also, a selected preload adjustment of the sleeve 30 is attained by means of an adjustable preloading nut 51. The nut 51 is threaded onto the outer end of the actuating shaft 18 so as to adjust the relative position of the sleeve 30 on the actuating shaft 18. A lock nut 52 is provided for locking the adjusting nut 51 in place on the actuating shaft 18. The screws 25 and 51, respectively, limit the total amount by which the force link 10 can be extended and retracted.

Referring to FIGS 2 and 4, the force link 10 can be connected in any push-pull linkage in an aircraft control system. Although the invention will be described in connection with an helicopter control system, it is understood that the force link can be used in any aircraft control system, wherein an autopilot and/or a stability augmentation system is being utilized. The actual location of the force links, in an helicopter rotor pitch control system as well as in a cyclic pitch or roll control system for controlling a swash plate, can be in any of a number of places where there is a push pull relationship. For example, one end of the force link may be fixed to a crank arm of an autopilot servomotor and the other end fixed to a bell crank in a manual control system where the control motion of the control stick or pedal is transmitted by means of some form of shaft rotation. Alternatively, if there is push-pull linkage in the aircraft control system, the force link can be directly incorporated by merely breaking the linkage and inserting the force link 10, by means of the eyes 12 and 16.

In the cyclic pitch swash plate control system of a helicopter, FIG. 2, the force link 10 has one end fixed to a crank arm 60 of a servo motor 61 with the other end fixed to a bellcrank 62 operated by a pilot's cyclic pitch control stick 63. Motion of the bellcrank 62 is transmitted to a mechanical differential via a push-pull rod 65 for changing the pitch of a swash plate 66. Motion from the differential 64 is preferably transmitted through a push-pull linkage 67 which has a conventional hydraulic booster unit 68 therein. Movement of the swash plate 66 causes aerodynamic response in the helicopter fuselage 70, which is schematically illustrated.

The autopilot in FIG. 2 is provided with a vertical displacement gyro 71 which reacts in response to any helicopter fuselage deviation vertically from a reference plane. Accordingly, any deviation of the helicopter fuselage 70 from the reference plane causes the gyro 71 to generate an electrical output signal of a phase depending upon whether fuselage displacement is taking place in a vertically upwardly or a vertically downwardly direction. The magnitude of the signal is representative of the amount of fuselage pitch and is fed from the vertical gyro 71 to a mixing point 72 by means of an electrical connection 73. From the mixing point 72, the displacement signal from the gyro 71 feeds into an amplifier 75 by means of an electrical conduit 74. The output of the amplifier 75 is fed via an electrical conduit 76 to energize and excite the synchronous servomotor 61.

Mixing point 72 is a conventional electrical juncture where the various voltages may combine. In its simplest form it is a point where the output conductors from elements 71, 100, 101, and 80 form a common juncture. In its most complicated form mixing point 72 would be composed of resistors and capacitors arranged to insure proper phase and gradient relationships of the outputs from elements 71, 100, 101, and 80. For purposes of this invention, however, it may be assumed that the outputs from the elements are of proper phase and gradient relationships.

Should the helicopter be on a normal horizontal course and the pilot decide to nose-up the helicopter fuselage 70 by operating the cyclic pitch stick 63, it is necessary for the pilot to overcome the resistive force of the spring 42 so as to cause, for example, the retraction of the force link 10. Accordingly, the core 33 moves to the left, as seen in FIG. 1, so that a displacement signal of proper electrical phase is fed back to an integrator unit 80 by means of an electrical conduit 81 from the transformer 34. More particularly, a signal is fed to the integrator 80 from a secondary winding 82 of the transformer 34. The transformer 34 has two primary windings 83 and 84 of the same voltage but of opposite electrical phase. The output of the integrator 80 is a function of the algebraic product of the total time the force link 10 is retracted multiplied by the magnitude of the total distance by which the armature has been moved from its central null position relative to the primary transformer windings 83 and 84. The output of the integrator 80 is fed at a predetermined rate to the mixing point 72.

Referring to FIG. 3, the integrator 80 is comprised of an amplifier 86 having its inputs connected to the transformer pick-off coil 82 and its output electrically connected to a synchronous motor 87, which is mechanically connected to drive a generator unit 88. A pickoff coil 89 of a generator 88 feeds a nulling signal back into and in series with the input to the amplifier 86 so that the feedback is proportional to servo shaft displacement and speed of the synchronous motor 87. The signal picked off by the generator coil 89 is opposite in phase to that of the secondary winding 82 of the transformer 34. A drive shaft 90 of the synchronous motor 87 positions a rotor carrying an input coil 91 of a synchro transmitter 92 and transmits a signal by a secondary winding 93, which is preferably Y-shaped. The transmitter winding 93 feeds a signal, proportional to the product of time and magnitude of relative displacement of the core 33, to the mixing point 72 in series with the amplifier 75 via leads 94, 74. The output of the synchromotor 87 is nulled because the signal picked off from the winding 89 is in opposition to the signal picked off by the winding 82 and accordingly, when the sum of the two signals is zero, the output of the amplifier 86 is nulled.

In order that the output of the servomotor 61 be nulled for a given input from the cyclic pitch stick, a feedback unit 100 is provided for nulling the output of the amplifier 75. Furthermore, in order to prevent overrun and hunting of the servomotor 61 a followup follower unit 101 is provided in parallel with the feedback unit 100. The feedback unit 100 and the followup follower unit 101 are similar to those found in the U.S. Patent No. 2,919,384 issued December 29, 1959, to Louis S. Guarino and William M. Ogden for a "Helicopter Automatic Engine Speed Selector and Control". Alternatively, the feedback and followup follower unit 100, 101 may be similar to that disclosed in copending patent application entitled "Stability Augmentation System" by Stephen J. Sikora and Louis S. Guarino, application Serial No. 862,730, filed December 29, 1959.

Referring to FIG. 2, should a gust of wind cause the helicopter 70 to suddenly pitch up, a proportionate displacement signal is fed to the amplifier 75 via the leads 73, 74 from the displacement gyro 71. Should the pilot simultaneously desire to pitch up the helicopter 70 by a slightly greater degree, the cyclic pitch stick 63 is pulled back and the force link 10 is contracted. As a result, a signal is fed from the transformer 34 via the integrator 80 to the mixing point 72. Now since the aircraft is already inadvertently nosed-up by the gust of wind, the signal from the integrator 80, which has been picked off from the force link 10, will be in opposition to the signal from the vertical displacement gyro 71 and the difference of that signal will be transmitted to the amplifier 75. Since it is desired to nose the aircraft up slightly more than that which has been inadvertently caused, only the difference between the signals from the vertical gyro 71 and the integrator 80 will be fed to the servo motor 61 for causing a signal to be transmitted via force link mechanism 10 and the link 65 to the mechanical differential 64 and accordingly to slightly pitch up the swash plate 66.

Conversely, if the helicopter had accidentally or inadvertently pitched down due to ambient atmospheric conditions, the signals from the vertical gyro 71 and the integrator 80 would be additive and accordingly the sum of the signals would be fed to the amplifier 75.

Referring to FIG. 4, an automatic and manual control system for the yaw axes of the helicopter is schematically illustrated. The system is comprised of a force link 10 adapted to transmit control motion from a crank arm 120 of a synchro motor 121 to a tail rotor pitch control mechanism 122 via a push-pull linkage 123, a mechanical differential 124, and a shaft linkage 125, which preferably has an hydraulic booster unit 126 therein. Change of the pitch setting of the tail rotor causes aerodynamic response of the helicopter fuselage 70. The synchro motor 121 is energized by an error signal generated by a heading reference gyro unit 130 and transmitted via electrical conduits 131, 132, a switch 133 normally closed with a contact 134, a mixing point 135, an electrical conduit 136, an amplifier 137, and an amplifier output conduit 138. The output of the amplifier 137 is nulled by means of a feedback mechanism 140. Overrun and hunting of the servo motor 121 is eliminated by means of a followup follower mechanism 141 connected in parallel with the feedback mechanism 140. Signals are picked off from the servo motor 121 and fed to the mechanisms 140, 141 via a line 142. The outputs of the mechanisms 140, 141 are connected to the mixing point 135 via line 143.

In order for the helicopter to execute "ball center" turn maneuvers without sideslip and undue yawing and rolling, a dynamic vertical displacement gyro unit 150 is adapted to be connected into the autopilot circuit preferably whenever a roll of greater than four degrees in either direction is experienced by the helicopter and when the airspeed preferably exceeds thirty knots. More particularly, a roll synchronizing servo mechanism 151 is adapted to move switch 133 to contact 152 when the helicopter fuselage roll exceeds four degrees in either direction. An airspeed servo mechanism 153 moves a switch 154 from contact 155 to contact 156 when the airspeed exceeds thirty knots. Accordingly, the pitch of the tail rotor is controlled by the dynamic vertical gyro 150.

Operation of rudder pedals 159 schematically shown in FIG. 4, causes the extension or contraction of the force link 10 via a crank arm 160. The signal picked off at the force link 10 is fed to an integrator 161 via line 162. The output of the integrator 161 feeds to the mixing point 135 via a line 163. The integrator 161, the feedback mechanism 140 and the followup follower mechanism 141 of FIG. 4 are respectively similar to the integrator 80, the feedback mechanism 100 and the followup follower mechanism 101 of FIG. 2.

A limit switch 170 is located within the housing 11, FIG. 1, and adapted to be actuated by axial movement of the flange 19 of the actuating shaft 18. The actuation of the switch 170 can be used to signal the operation of the manual controls. Also the signal can be used to put certain equipment, such as a command altitude control system, out of circuit which might interfere with the pilot's override of the automatic control systems or parts thereof.

While several specific embodiments in accordance with the invention have been shown and described, it is understood that the invention is susceptible of many changes and modifications, as known to persons skilled in the art, and is intended to cover all such changes and modifications coming within the scope of the appended claims.

What is claimed is:

1. In an aircraft having a control surface, the combination comprising manual control means including push-pull means for operating and controlling said control surface, automatic pilot means including displacement gyro means adapted to generate an electrical error signal proportional to the displacement of the aircraft from an established reference attitude, amplifier means, circuit means electrically connecting said amplifier means to said gyro means, synchro motor means electrically connected to the output of said amplifier means and having a crank arm operating said push-pull means, force link means connected in said push-pull means for transmitting mechanical motion initiated by said synchro motor means, said circuit means having a mixing junction, feedback means connected from said synchro motor means to said mixing junction for picking off a null signal and nulling the output of said amplifier means, followup-follower means connected in parallel with said feedback means for preventing overrun and hunting of said synchro motor means, said force link means having a housing with a spring loaded plunger therein for permitting said force link means to be contracted and elongated by override command movement of said manual control means, variable impedance transformer means in said housing having a core adapted to be axially displaced when the length of said force link means is changed for picking off an electrical command signal representative of change of force link length and the duration the length of said force link is changed, integrator means connected to integrate said command signal, said integrator means having an output electrically connected to said mixing junction in opposition to said electrical error signal of said gyro means, said integrator means supplying said electrical command signal to said mixing junction at a predetermined rate, an electrical command signal of one phase being picked off from said transformer means and fed to said integrator when said force link means is contracted and an electrical command signal of an opposite phase being picked off when said force link means is extended upon the manipulation of said manual control means for overriding said automatic pilot means.

2. In an aircraft having a control surface, the combination comprising manual control means including push-pull means for operating and controlling said control surface, gyro means adapted to generate an electrical error signal that is a function of the displacement of the aircraft from an established reference condition, amplifier means, circuit means electrically connecting said amplifier means to said gyro means, synchro motor means driven by the output of said amplifier means and having a crank arm operating said push-pull means, force link means connected in said push-pull means for transmitting the mechanical motion initiated by said synchro motor means, said circuit means having a mixing junction, feedback means connected from said synchro motor means to said mixing junction for picking off a null signal and nulling the output of said amplifier means, followup-follower means connected in parallel with said feedback means for preventing overrun and hunting of said synchro motor means, said force link means having a housing with a spring loaded plunger therein for permitting said force link means to be contracted and elongated by said override command movement of said manual control means, differential transformer means in said housing having a core adapted to be axially displaced when the length of said force link means is changed for picking off an electrical command signal representative of change of force link length and the duration the length of said force link means is changed, integrator means connected to integrate said command signal, said integrator means having an output electrically connected to said mixing junction in opposition to said electrical error signal of said gyro means, said integrator means supplying said electrical command signal to said mixing junction at a predetermined rate, an electrical command signal of one phase being picked off from said transformer means and fed to said integrator when said force link means is contracted and an electrical command signal of an opposite phase being picked off when said force link means is extended upon the manipulation of said manual control means for overriding said gyro means.

3. A force link for a push-pull linkage in an aircraft control system and comprising, a cup-shaped elongated housing, plunger means slidably disposed in said housing, first means connected to one external end of said housing for connecting said housing into the push-pull linkage, second means connected to the outer end of said plunger means for connecting the same into the push-pull linkage, resiliently compressible means connected to said plunger means and to said housing internally of the latter for resisting and limiting the movement of said plunger means into and out of said housing, variable impedance transformer means disposed in said housing and having an axially movable core carried by said plunger means for signalling the movement of said plunger means into and out of said housing from a central zero signal position in said housing.

4. A force link for a push-pull linkage in an aircraft control system and comprising, a cup-shaped elongated housing, plunger means slidably disposed in said housing, first means connected to one external end of said housing for connecting said housing into the push-pull linkage, second means connected to the outer end of said plunger means for connecting the same into the push-pull linkage, resiliently compressible means connected to said plunger means and to said housing internally of the latter for resisting and limiting the movement of said plunger means into and out of said housing, command signal pickoff means including transformer means disposed in said housing and having an axially movable core carried by said plunger means for signalling the movement of said plunger means into and out of said housing from a central zero signal position in said housing.

5. A force link comprising, a cup-shaped housing having a cylindrical opening formed therein extending inwardly from one outer end thereof, a tubular adjusting and preloading screw threaded into said outer end of said cylindrical opening, a tubular actuating shaft coaxially disposed in said cylindrical opening and extending out of said housing, first and second spring retainers slidably disposed on the inner end of said actuating shaft, an helical spring disposed about said actuating shaft and biasing said first and second spring retainers apart, a sleeve disposed about said actuating shaft and having an inner end bearing against said second spring retainer, an adjusting and preloading nut threaded onto the outer end of said actuating shaft and bearing against the outer end of said sleeve, a first lock nut threaded onto the outer end of said actuating shaft and bearing against said preloading nut for locking the same in place, a rod end member having an eye on the outer end thereof, said rod end member being threaded onto the outer end of said actuating shaft, a second lock nut threaded onto said preloading screw and bearing against the outer end of said housing for locking said preloading screw in place, said housing having an annular shoulder formed therein forming the inner end of said cylindrical opening and acting as a seat for said first spring retainer, an annular stop flange formed on the inner end of said actuating shaft for retaining said first spring retainer thereon, a variable impedance transformer fixed in the bottom of said housing and having a movable core coaxially slidable therein, an adjustable armature rod threaded into said actuating shaft with the inner end thereof being fixed to said transformer core, a third lock nut threaded onto the outer end of said armature rod and bearing against said actuating shaft for locking said armature rod in place, said helical spring biasing said actuating shaft and transformer core to a centered-zero position and resisting movement thereof axially in either direction, and stud bolt means forming an eye threaded into the bottom of said housing coaxial with the eye of said rod end member.

6. A force link comprising, a cup-shaped housing having a cylindrical opening formed therein extending inwardly from one outer end thereof, a tubular adjusting and preloading screw threaded into said outer end of said cylindrical opening, a tubular actuating shaft coaxially disposed in said cylindrical opening and extending out of said housing, first and second spring retainers slidably disposed on the inner end of said actuating shaft, a spring disposed about said actuating shaft and between said first and second spring retainers apart, a sleeve disposed about said actuating shaft and having an inner end bearing against said second spring retainer, an adjusting and preloading nut threaded onto the outer end of said actuating shaft and bearing against the outer end of said sleeve, a rod end member having an eye on the outer end thereof, said rod end member being threaded onto the outer end of said actuating shaft, said housing having an annular shoulder formed therein forming the inner end of said cylindrical opening and acting as a seat for said first spring retainer, an annular stop flange formed on the inner end of said actuating shaft for retaining said first spring retainer thereon, a variable impedance transformer fixed in the bottom of said housing and having a movable core coaxially slidable therein, an adjustable armature rod threaded into said actuating shaft with the inner end thereof being fixed to said transformer core, said spring biasing said actuating shaft and transformer core to a centered-zero position and resisting movement thereof axially in either direction and stud bolt means forming an eye threaded into the bottom of said housing coaxial with the eye of said rod end member.

7. A force link comprising, a cup-shaped housing having a cylindrical opening formed therein extending from one end thereof, a tubular adjusting and preloading screw threaded into the outer end of said cylindrical opening, a tubular actuating shaft coaxially disposed in said cylindrical opening and extending out of said housing, first and second spring retainers slidably disposed on the inner end of said actuating shaft, a spring disposed about said actuating shaft and between said first and second spring retainers, a sleeve disposed about said actuating shaft and having an inner end bearing against said second spring retainer, an adjusting and preloading nut threaded onto the outer end of said actuating shaft and bearing against the outer end of said sleeve, a rod end member threaded onto the outer end of said actuating shaft, said housing having an annular shoulder formed therein forming the inner end of said cylindrical opening and forming a seat for said first spring retainer, a stop formed on the inner end of said actuating shaft for retaining said first spring retainer on said actuating shaft, transformer means fixed in the bottom of said housing and having a movable core slidable therein, an adjustable armature rod carried by said actuating shaft with the inner end thereof being fixed to said transformer core, and said spring biasing said actuating shaft and transformer core to a centered-zero position and resisting movement thereof axially in either direction.

8. A force link for a push-pull linkage in an aircraft control system and comprising, a cup-shaped elongated housing, plunger means slidably disposed in said housing, first means connected to one external end of said housing for connecting said housing into the push-pull linkage, second means connected to the outer end of said plunger means for connecting the same into the pushpull-pull linkage, resiliently compressible means connected to said plunger means and to said housing internally of the latter for resisting and limiting the movement of said plunger means into and out of said housing, command signal pickoff means including transformer means disposed in said housing and having an axially movable core carried by said plunger means for signalling the movement of said plunger means into and out of said housing from a central zero signal position in said housing, adjustable means for limiting the length of travel of said plunger means into and out of said housing.

9. In an aircraft having a control surface, the combination comprising: manual control means including push-pull means for operating and controlling said control surface, automatic pilot means including displacement gyro means adapted to generate an electrical error signal proportional to the displacement of the aircraft from an established reference attitude, amplifier means, circuit means electrically connecting said amplifier means to said gyro means, synchro motor means electrically connected to the output of said amplifier means and having a crank arm operating said push-pull means, force link means connected in said push-pull means for transmitting mechanical motion initiated by said synchro motor means, said circuit means having a mixing junction, feedback means connected from said synchro motor means to said mixing junction for picking off a null signal and nulling the output of said amplifier means, follow-up follower means connected in parallel with said feedback means for preventing overrun and hunting of said synchro motor means, said force link means including a cup-shaped elongated housing, plunger means slidably disposable in said housing, first means connected to one external end of said housing for connecting said housing into the push-pull linkage, second means connected to the other end of said plunger means for connecting the same into the push-pull linkage, resiliently compressible means connected to said plunger means and to said housing internally of the latter for resisting and limiting movement of said plunger means into and out of said housing, command signal pickoff means including variable impedance transformer means disposed in said housing and having an axially movable core carried by said plunger means for signalling the movement of said plunger means into and of said housing from a central position in said housing whereby said force link means can be contracted and elongated by override command movement of said manual control means, integrator means connected to integrate said command signal, said integrator means having an output electrically connected to said mixing junction in opposition to said electrical error signal of said gyro means, said integrator means supplying said electrical command signal to said mixing junction at a predetermined rate, an electrical command signal of one phase being picked off from said transformer means and fed to said integrator when said force link means is contracted and an electrical command signal of an opposite phase being picked off when said force link means is extended upon the manipulation of said manual control means for overriding said automatic pilot means.

10. In an aircraft having a control surface, the combination comprising: manual control means including push-pull means for operating and controlling said control surface, automatic pilot means including displacement gyro means adapted to generate an electrical error signal proportional to the displacement of the aircraft from an established reference altitude, amplifier means, circuit means electrically connecting said amplifier means to said gyro means, synchro motor means electrically connected to the output of said amplifier means and having a crank arm operating said push-pull means, force link means connected in said push-pull means for transmitting mechanical motion initiated by said synchro motor means, said circuit means having a mixing junction, said force link means including a cup-shaped elongated housing having a closed end and an open end, plunger means slidably disposed in said housing, first means connected to the closed end of said housing for connecting said housing to said manual control means, second means connected to said plunger means for connecting the same to said crank arm, resiliently compressible means connected to said plunger means and to said housing internally of the latter for resisting and limiting movement of said plunger means into and out of said housing, command signal pickoff means including variable impedance transformer means disposed in said housing and having an axially movable core carried by said plunger means for signalling the movement of said plunger means into and out of said housing from a central position in said housing whereby said force link means can be contracted and elongated by override command movement of said manual control means, said force link means including means for adjusting said compressible means to prevent change in length of said force link means when the tensile or compressional force in said linkage means is below a predetermined value, integrator means connected to integrate said command signal, said integrator means having an output electrically connected to said mixing junction in opposition to said electrical error signal of said gyro means, said integrator means supplying said electrical command signal to said mixing junction at a predetermined rate, an electrical command signal of one phase being picked off from said transformer means and fed to said integrator when said force link means is contracted and an electrical command signal of an opposite phase being picked off when said force link means is extended upon the manipulation of said manual control means for overriding said automatic pilot means.

11. In an aircraft having a control surface, the combination comprising: manual control means including linkage means for operating and controlling said control surface, gyro means adapted to generate an electrical error signal that is a function of the displacement of the aircraft from an established reference condition, amplifier means, circuit means connecting said amplifier means to said gyro means, synchro motor means driven by the output of said amplifier means and operating said linkage means, force link means connected in said linkage means for transmitting the motion initiated by said synchro motor means, mechanical bias means included in said force link means preventing change in length of said force link means when the tensile or compressional force in said linkage means is below a predetermined value, said circuit means having a mixing junction, feedback means connected from said synchro motor means to said mixing junction for picking off a null signal for nulling the output of said amplifier means, electrical command signal pickoff means in said force link means adapted to pick off a command signal when the length of said force link means is changed by said manual control means, said electrical command signal being representative of change of length and the duration of the change of length of said force link means, integrator means connected to integrate said electrical command signal to provide a signal proportional to the product of magnitude and duration of the change of length of said force link, said integrator means having an output electrically connected to said mixing junction in opposition to said electrical error signal of said gyro means, said integrator means supplying said electrical command signal to said mixing junction at a predetermined rate, an electrical command signal of one phase being picked off from said command signal pickoff means and fed to said integrator when said force link means is contracted and an electrical command signal of an opposite phase being picked off when said force link means is extended upon the manipulation of said manual control means for overriding said gyro means.

(References on following page)

References Cited in the file of this patent

UNITED STATES PATENTS

| | | |
|---|---|---|
| 2,133,168 | Gwinn | Oct. 11, 1938 |
| 2,276,843 | Hathaway | Mar. 17, 1942 |
| 2,451,263 | Webb | Oct. 12, 1948 |
| 2,590,626 | Jones | Mar. 25, 1952 |
| 2,865,337 | Dennis et al. | Dec. 23, 1958 |
| 2,888,635 | Volk | May 26, 1959 |
| 2,895,086 | Pettit | July 14, 1959 |
| 2,896,883 | Andeen | July 28, 1959 |